(12) United States Patent
Finestone et al.

(10) Patent No.: US 6,706,388 B2
(45) Date of Patent: *Mar. 16, 2004

(54) SELF-CLOSING PACKAGING MATERIAL

(76) Inventors: Arnold B. Finestone, 2400 Presidential Way, West Palm Beach, FL (US) 33401; Gilbert Bloch, 3349 St. Malo Ct., Palm Beach Gardens, FL (US) 33410

( * ) Notice: Subject to any disclaimer, the term of this patent is extended or adjusted under 35 U.S.C. 154(b) by 197 days.

This patent is subject to a terminal disclaimer.

(21) Appl. No.: 09/781,181

(22) Filed: Feb. 12, 2001

(65) Prior Publication Data

US 2002/0110675 A1 Aug. 15, 2002

(51) Int. Cl.[7] .................. B65B 11/00; B32B 27/10
(52) U.S. Cl. .................. 428/343; 428/351; 428/354; 428/507; 428/511; 428/513; 53/449; 53/461; 53/466; 53/172
(58) Field of Search .................. 53/172, 449, 450, 53/461, 547, 466; 428/507, 511, 513, 343, 351, 354

(56) References Cited

U.S. PATENT DOCUMENTS

| | | | |
|---|---|---|---|
| 4,680,918 A | 7/1987 | Lovell | 53/466 |
| 5,244,702 A | 9/1993 | Finestone et al. | 428/34.3 |
| 5,595,046 A | 1/1997 | Weder | 53/397 |
| 5,655,707 A | 8/1997 | Jensen | 229/160.2 |
| 5,704,481 A | 1/1998 | Lutz | 206/484 |
| 5,780,150 A | 7/1998 | Bloch et al. | 428/350 |
| 5,962,099 A | 10/1999 | Bloch et al. | 428/41.4 |
| 6,076,969 A | 6/2000 | Jaisle et al. | 383/211 |
| 6,085,904 A | 7/2000 | Perdue, Jr. | 206/484 |
| 6,115,999 A | 9/2000 | Adelman | 53/465 |
| 6,133,173 A | 10/2000 | Riedel et al. | 442/400 |
| 6,135,506 A | 10/2000 | Chess et al. | 283/80 |
| 6,436,499 B1 | 8/2002 | Krampe et al. | 428/40.1 |

Primary Examiner—Monique R. Jackson
(74) Attorney, Agent, or Firm—Winston & Strawn LLP

(57) ABSTRACT

A self-closing package formed from a unitary two-ply or three-ply laminate sheeting having an inner surface which is entirely coated with cohesive material, which has the property of sticking only to itself, and having a first portion and second portion. An article may be placed on the first portion of the laminate sheeting before folding and forming he laminate sheeting into a self-closing package. To form the package, the second portion of the laminate sheeting is pulled upward around the article and folded over both the article and the first portion of the laminate sheeting so that the inner surface of both the first portion and second portion are opposed to each other. The package is closed and sealed by the cohesive coated inner surfaces of the first and second portions coming into contact with each other and thereby sticking to each other.

21 Claims, 1 Drawing Sheet

SELF-CLOSING PACKAGING MATERIAL

FIELD OF INVENTION

This invention relates to a paper-plastic laminate packaging material and a paper-plastic-paper laminate packaging material in the form of sheeting which is capable of being converted into a self-closing package. These materials include a layer of cohesive on one side to enable the material to be self adhering after being placed around or about an item to be packaged.

BACKGROUND ART

In the past, both paper-plastic laminate sheeting and cohesives have been developed. U.S. Pat. No. 5,244,702 discloses a paper-plastic laminate sheeting capable of being converted by conventional equipment into envelopes, grocery bags and other dilatable container products that are initially in a flat state. This patent describes a paper-plastic laminate sheeting in which a facing paper sheet is cold-laminated to a reinforcing film of synthetic oriented plastic material, whereby the properties of the oriented film are unimpaired and the products made therefrom have exceptional strength tear and burst characteristics. U.S. Pat. No. 5,780,150 discloses a sealing tape constituted by a paper-plastic laminate for sealing a carton or other article formed of recyclable material.

The use of cohesive materials in product packaging are generally known in the art. U.S. Pat. No. 6,076,969 issued to Jaisle et al. discloses a product package having a re-sealable closure employing a cohesive and a pressure-sensitive adhesive for reseal capability. U.S. Pat. No. 5,655,707 to Jensen discloses a paperboard container fashioned from a unitary blank which is precut and pre-scored to yield desirable fold lines, with the top of the container being provided with a pair of upstanding flanges having a strip of cohesive material so that the two upper flanges are secured together by virtue of the cohesive material on each.

There is a large increase in the mailing of packages due to catalog sales, sales over the internet and other fulfillment houses. Most of these packages are of heavy paper or cardboard construction. Such constructions are convenient, provided in different sizes and are of low cost, but these constructions are not resistant to moisture in the form of snow, rain or other forms of water. The increased number of packages to be shipped creates a need for new and improved, flexible packaging materials that can be used to accommodate different sizes of such packages as well as to protect such packages from adverse weather conditions during shipment. The present invention now provides such a material.

SUMMARY OF THE INVENTION

In accordance with the present invention, a new packaging material in the form of a unitary laminate sheeting has been developed. The laminate sheeting is flexible, tough, and water impermeable and is capable of enclosing an article within a formed pocket.

Advantageously, the novel packaging material of the present invention provides the ability to achieve outstanding printed graphics thereon, based on the selection of paper for the paper ply component of the packaging material.

The packaging material generally includes a paper layer and a water impermeable plastic film layer having a first corona discharge treated surface. The first corona-discharge treated surface is adhesively laminated to the paper layer to form a paper-plastic film laminate having first and second opposed outer surfaces. The packaging material additionally includes a layer of cohesive coating on at least a portion of one of the first and second outer surfaces. The cohesive material of the invention has the property of sticking only to itself. Thus, when an article or object is placed on the cohesive coated surface of the laminate sheeting, the sheeting can be folded over the article or object and when the opposing cohesive coated surfaces come into contact with each other, they form a cohesive—cohesive bond thereby enclosing the article within a formed pocket. Since the cohesive has the property of only sticking to itself, the coated surface does not stick to the article or object within the package. The layer of cohesive material may be applied to the outer surface of the paper layer or the plastic film layer of the packaging material.

In another embodiment, the packaging material comprises a three ply, paper-plastic-paper laminate sheeting. The plastic film has a second corona discharge treated surface opposite the first corona discharge treated surface, wherein the second corona-discharge surface is adhesively cold laminated to the second paper layer, thereby producing a three ply laminate sheeting having a first and second outer surfaces of paper with the cohesive material coating applied onto one of the outer surfaces of paper.

Generally, the paper layer has a thickness of from about 3 to 6 mils, while the plastic film layer has a thickness of from at least about 0.5 to about 3 mils. The plastic film component typically comprises a polymer selected from the group consisting of polypropylene, polyethylene and polyester, while the paper layer may be coated paper, Kraft paper, or higher quality paper such as Bond or white paper. The paper layer may be metallized to obtain a decorative packaging material. The metallized paper layer may also be provided with graphics thereon. Also, the plastic film component of the packaging material may be oriented or biaxially oriented to impart high-strength thereto, and is cold laminated to the paper ply so that lamination is effected without heat that would impair the orientation and strength of the plastic film ply.

The above described packaging material is capable of achieving outstanding printed graphic thereon so that if desired, the exterior of the package may exhibit logos, trademarks, emblems and other hallmarks.

Depending on the resultant package desired, the packaging material may comprise a plastic film layer as the outer surface layer of the package thereby constituting a water-impermeable package. The outer surface of the plastic layer may be corona discharge treated to render it receptive to inks and printing. Alternatively, the packaging material may comprise a paper layer as the outer surface layer of the package and a plastic film layer as the inner surface of the package. Further, the printable paper layer may comprise the inner layer of the package, wherein the printed outer surface of the paper layer may be exposed through a transparent plastic layer, which forms the exterior of the package and is cold laminated to the printed surface of the paper layer. Thus, the printed surface of the paper layer is legible through the transparent plastic film and the paper layer itself is protected from rain, snow, or any other water elements by the water-resistant plastic film layer.

BRIEF DESCRIPTION OF THE DRAWINGS

For a better understanding of the invention, reference is made to the detailed description of the invention and the accompanying drawing therein.

DETAILED DESCRIPTION OF THE INVENTION

Figure 1:
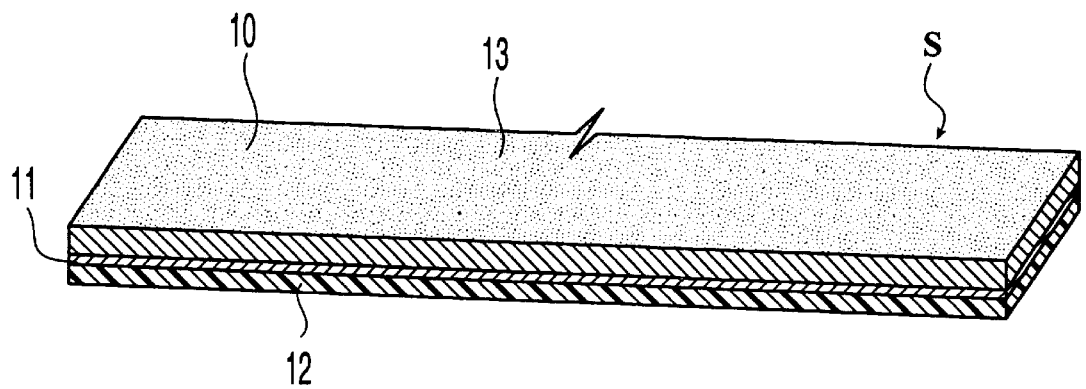
FIG. 1 illustrates a flexible, paper-plastic laminate sheeting in accordance with the invention.

The invention resides in a self-closing packaging material formed from a unitary paper-plastic laminate sheeting, in which at least a portion of one entire side of the laminate sheeting is coated with cohesive material. In accordance with the present invention, an article can be placed on the cohesive coated surface laminate sheeting and the coated laminate sheeting can be folded over so that the opposing cohesive coated surfaces of the laminate sheeting will stick to themselves and thereby secure and package the article therein. The self-closing packaging material may form a "fitted" package so that the article contained inside is snug and tightly held in place.

The present invention includes a laminate sheeting material with a cohesive material coated thereon. The laminate sheeting is a two ply or alternatively, may be a three ply laminate. The laminate sheeting is then coated with a layer of cohesive material. It may be desirable in some situations to coat less than the entire surface of the laminate sheeting. Accordingly, a screen type roller or rotary screen printing device can be used to selectively apply the coating upon only specific areas of the laminate sheeting. In addition, a spray head or series of spray heads may be used to selectively deposit a particular or random pattern. The pattern can be arranged to achieve a desired cohesive adhesion of the overall laminate sheeting. Alternatively, the coating can be applied to the entire outer surface of the laminate sheeting.

The type and amount of coating to be applied will vary depending upon the results desired. For example, when packaging articles of a standard size, the packager may desire packaging material that does not have a layer of cohesive material applied to one entire surface of the laminate sheeting. Instead, it may be desirable that the laminate sheeting have cohesive material coated only on the perimeter of the laminate sheeting so that the packaging material does not have cohesive in the areas of the sheeting that would be covered by the article. Thus, less cohesive would be needed and the packaging material would be less costly and a more efficient use of cohesive would be provided.

The paper layer of the packaging material preferably comprises Kraft paper and has a thickness of from about 3 to about 6 mils. The plastic film layer may be oriented to impart high strength thereto. A biaxial orientation is preferred for greatest strength. The plastic film layer preferably comprises a polymer selected from the group consisting of polypropylene, polyethylene and polyester and has a thickness of from at least about 0.5 to 3 mils.

The plastic film layer has a first corona-discharge treated surface. This treatment is applied to the plastic immediately before the first corona discharge treated surface is adhesively laminated to the paper layer. This enables a strong bond to be achieved between the plastic and paper to form a paper-plastic film laminate having first and second opposed outer surfaces.

The cold lamination process enables the present packaging material to be manufactured at much higher speeds than when other adhesives, such as hot melt adhesives, are utilized, for example due to the additional time required for cooling of the hot melt adhesive before a secure bond is achieved. If hot melt adhesives were used instead of cold lamination for joining the plastic film to the paper, the heat of the adhesive could cause the film to shrink, thus causing a loss of strength. Also, the hot melt adhesive does not achieve its final bond strength until the adhesive cools, and the plastic film can shrink before this happens. Moreover, a wrinkled or curled product often results due to the difference in the high strength and low strength areas of the plastic film.

The use of cold lamination is also advantageous when an oriented or biaxially-oriented plastic film is utilized. It is known that at elevated temperatures, such films relax and lose molecular orientation and strength. For example, when two sheets of biaxially-oriented polyester film are seamed together, using an ultrasonically-activated sealing bar to create internal friction and heat within the film, the films soften and fuse, with a resultant sealing line that is weak, such that the sheets then tend to tear along this line. Similar problems are encountered if an oriented film is exposed to high heat, such as if a hot melt adhesive would be used to join the film to the paper. Cold lamination utilizing a water-based adhesive is essential in order to produce a laminate that has high strength. Any of a wide range or water-based adhesives can be used, although a vinyl acetate ethylene copolymer is preferred. The paper layer absorbs the water from these adhesives so that a high strength lamination can be rapidly achieved. U.S. Pat. No. 5,244,702 provides further details on this cold lamination process, and is incorporated herein to the extent necessary to understand this feature of the invention.

Another benefit of the use of a water based adhesive is that this type of adhesive does not require the use of volatile organic solvents. Thus, adverse health and environmental effects are avoided because such solvents are not used. Also, additional costs for recovering or disposing of solvents are not incurred.

As noted above, the laminate sheeting includes a layer of cohesive material. The exposed plastic film of the paper/plastic film laminate can be corona discharge treated, so that the cohesive material may be applied to it with the paper layer forming the outer side of the packaging material. In this embodiment, the paper may be printed with graphics or the like to form an aesthetically pleasing packaging material. Alternatively, the cohesive material can be applied to the paper layer so that the exposed plastic film forms the outer side of the packaging material. Graphics or other printing can be applied to the side of the paper layer that is laminated to the plastic so that when clear plastic is used the graphics are visible through the plastic film. Also, the side of the paper layer facing the inside of the packaging can have the same or different graphics on its entire surface or only on those areas that are not covered with a layer of cohesive material. For either embodiment, the plastic film provides moisture resistance for the articles that are covered by the packaging material. The resultant laminate sheeting with cohesive coating thereon forms a self-closing packaging material that is flexible, water resistant, strong, and is capable of packaging articles of various sizes.

An unexpected benefit of the present packaging material is provided by the use of the paper/film laminate. The incorporation of this paper-plastic laminate into the packaging material provides sufficient body to resist twisting or curling to enable the material to be easily handled without concern of the material curling and sticking to itself.

Depending on the type of packaging material desired, the packaging material may further include an additional paper layer to form a paper-plastic-paper, three-ply laminate sheeting. The extra paper layer may be desirable for packaging objects with pointed edges or simply when a packaging material with more strength is desired. As the paper layers form the inner and outer sides of the packaging material, they can easily be printed with graphics or other indicia prior to application of the cohesive material. This enables the packaging material to have one appearance on the outside of the package and another, different appearance on the side of the material that faces the package. Advertising, coupons or other forms of indicia can be provided on the inner side if desired, in locations where cohesive material is not provided for use after removal of the packaging material.

Furthermore, if a decorative packaging material is desired, the packaging material may comprise a metallized or preferably aluminized paper ply wherein the metallized or aluminized surface of the paper ply forms the exterior of the package and the opposing surface is cold laminated to the plastic film ply. The plastic film ply is coated with cohesive material so that when the packaging material is in operation, the resultant package has an exposed decorative outer surface. An aluminized surface is preferred when a silver finish is desired, but other metallizing treatments, e.g., with copper, iron, or alloys, can be used when other colors are desired.

The packaging material of the present invention is preferably stored on a roll and dispensed therefrom as needed. Since the cohesive material only sticks to itself and only one surface of the packaging material contains the cohesive, when the packaging material is rolled up, the coated surfaces does not make contact with an opposing coated surface and no barriers are required to prevent the sheeting from sticking to itself while stored on the roll.

For applications, the packaging material can be used in automated wrapping equipment, wherein the resultant package is automatically wrapped by a machine generally known in the art, or alternatively the packaging material can be used in manual wrapping, wherein the packaging material is pulled off and cut from the roll, an article is placed on the surface of the packaging material and the packaging material is folded over and about the article. In either method of wrapping an article, the opposing coated surfaces of the packaging material come into contact and form cohesive—cohesive bonds thereby enclosing the article and forming a self-closing package. Alternatively, instead of packaging an article with one unitary sheet of packaging material, it may be desirable to use two sheets of packaging material. The two sheets of packaging material are placed on top of each other such that the cohesively coated surfaces of each unitary packaging material are opposing surfaces, the article is placed between the two sheets and the two sheets are placed in contact with each other so the contacted portions of the coated surfaces of the sheetings form cohesive—cohesive bonds and the article is enclosed within the packaging material, thereby forming a self-closing package.

One feature of the present invention is that it is capable of packaging articles of various sizes and shapes. The packaging material simply is pulled off the roll in an amount that accommodates the particular size of the particular article to be packaged.

It may be desirable that the packaging material have printable surfaces so that logos, messages, advertisements, emblems, trademarks or simply, addressee information etc., may be printed on the exterior or interior surfaces of the formed package. In this regard, the paper ply layer includes a printable surface. The decorative packaging material, if desired, may include a printable surface of metallized paper. Further, the plastic film ply may include a second corona discharge treated surface to render it receptive to inks so that it may exhibit graphics that may be desired. The outer surface of the plastic film ply may be metallized as by vacuum deposition to provide a decorative package.

The Plastic-Paper Laminate Sheeting

Referring now to FIG. 1, shown therein in an enlarged scale is a flexible paper-plastic sheeting S in accordance with the invention. Sheeting S includes a paper facing ply 10 whose gauge, weight and quality are appropriate for the self-closing package.

The paper ply 10 is cold-laminated by an adhesive layer 11 to the plastic film ply such as polypropylene or polyester (MYLAR). The inner surface of the plastic ply 12 is rendered wettable by a corona-discharge treatment to enhance the energy at this surface so that it is receptive to adhesives.

Coated on the exposed surface of either the paper ply 10 or the plastic ply 12 is a layer of cohesive material 13, so that the laminate sheeting will stick to itself by forming cohesive—cohesive bonds when the cohesive surfaces come into contact with each other.

The plastic film ply 12 is no greater than 3 mils in thickness and is at least about 0.5 to 1 mil in thickness. The paper base ply 10 is thicker, preferably being 2 or 3 mils thick.

When the plastic film ply is biaxially-oriented, it has exceptional tensile strength, such orientation being effected by stretching the film along both its transverse and horizontal axes to molecularly orient the film structure. The strength of the thicker paper base ply 10, per se, is not high, but the paper-plastic laminate has both body and high strength.

Cold lamination of the plies is effected by a water-based adhesive, preferably a water-based vinyl acetate ethylene copolymer composition having an affinity both for the paper ply and the film ply. Because the water-based adhesive is fluid at ambient temperature and is not a hot melt adhesive; no heat is applied to the oriented film as it is being laminated to the paper ply. A water-based adhesive, once cured, is not water soluble and is not remoistenable.

It is important to bear in mind that an oriented film is heat-sensitive and that at elevated temperatures, the film relaxes and loses its molecular orientation and strength. It is known, for example, that when two sheets of oriented polyester film are seamed together, using an ultrasonically-activated sealing bar for this purpose which creates internal friction and heat within the film, this causes the superposed films to soften and fuse. The resultant sealing line is weak, and the sheets then tend to tear along this line. Cold lamination is therefore essential to the present invention in order to produce paper-film laminate of high strength.

It is to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, the adhesive will not be adsorbed by the film.

The Self-Closing Packaging Material

Figure 2:
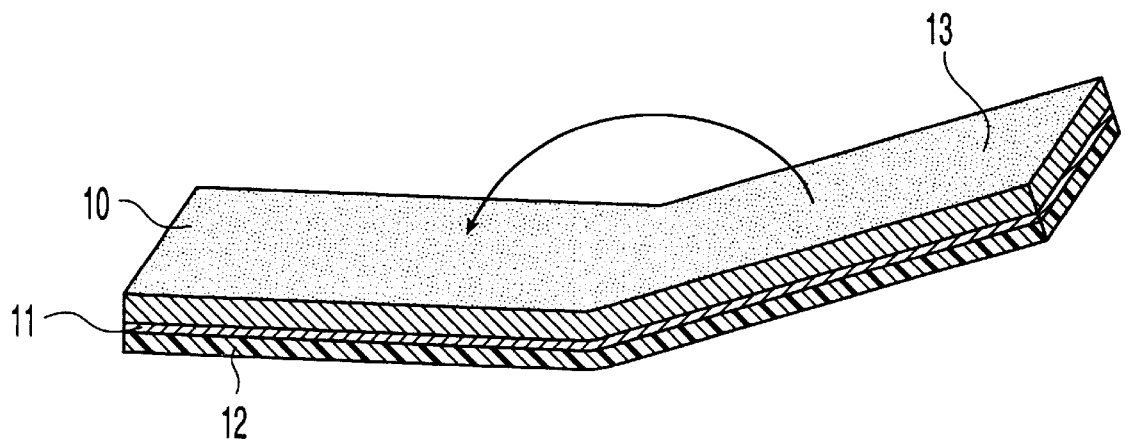
FIG. 2 is a perspective view of the upper portion of the self-closing package formed by folding the second portion of the laminate sheeting FIG. 1.

FIG. 2 shows a unitary paper-plastic laminate sheeting for receiving an article to be packaged upon the inner surface of the sheeting. As illustrated, the cohesive coated inner surface is folded over so that the laminate sheeting forms two opposing inner surfaces coated with cohesive material so that when the surfaces come into contact with each other cohesive—cohesive bonds are formed thereby sealing and closing the package.

Figure 3:
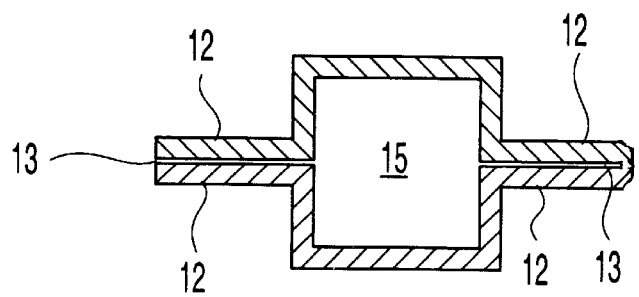
FIG. 3 shows an article, such as a box, wrapped with the packaging material of the invention.

FIG. 3 shows cross section view of an article contained within the self closed package. The self-closing package was formed by the plastic-paper laminate sheeting S of FIG. 1, being folded around and about article 15 so that the cohesive coated surface 13 come into contact and form cohesive—cohesive bonds, thereby securing the sheets together about and enclosing the article 15.

What is claimed is:

1. A package-forming material for forming a package which encloses and seals an article therein, comprising:
    a packaging material in the form of a laminate that includes a water impermeable plastic film having a first corona discharge treated surface that is adhesively cold laminated to a first paper layer, wherein the film and paper layer have the same dimensions, and the laminate has a surface that is receptive to receiving adhesive or cohesive materials; and
    a cohesive material applied to one entire surface of the laminate;
    wherein the packaging material is placed about an article to be packaged such that a first portion of the surface of the packaging material that includes cohesive material contacts another portion of the surface that includes cohesive material to adhere such portions to each other and form a sealed package which encloses the article.

2. The package-forming material of claim 1 wherein the adhered cohesive portions form an adhered band which completely surrounds the article to be packaged.

3. The package-forming material of claim 1, wherein the plastic film of the laminate includes a second corona discharge treated surface that is adhesively cold laminated to a second paper layer.

4. A package comprising the package-forming material of claim 1 wherein the cohesive material is present upon first and second surface portions of the packaging material and the package is formed by placing the first surface of the packaging material above the article to be packaged and by placing the second surface portion of the packaging material below the article to be packaged, such that the first and second surface portions of the packaging material that include the cohesive material contact and adhere to each other to form a sealed package which encloses the article.

5. The package of claim 4 wherein the first and second surface portions of the packaging material are provided on one side of a single sheet of the laminate and then the sheet is folded around the article to be packaged to place the cohesive material containing portions in face-to-face orientation so that they can adhere together to form the package.

6. The package of claim 4 wherein the first and second surface portions are provided as first and second laminate sheets which are placed above and below the article to be packaged with the cohesive material containing surface portions in face-to-face orientation so that they can adhere together to form the package.

7. The package of claim 4 wherein the adhered cohesive portions form a margin which completely surrounds the article to be packaged.

8. The package-forming material of claim 1 wherein the plastic film is laminated to the paper layer with an adhesive that includes a water-based acrylic copolymer composition or a vinyl acetate ethylene copolymer, and wherein the paper layer is coated paper, Kraft paper, bond paper or white paper having a thickness of about 3 to 6 mils and the plastic film comprises polypropylene, polyethylene or polyester and has a thickness of about 1 to 3 mils.

9. The package-forming material of claim 8 wherein the paper layer of the laminate includes a printed surface, the printed surface is adhered to the plastic film, the plastic film forms an outer portion of the laminate, and the cohesive material is applied to the paper layer.

10. The package-forming material of claim 8 wherein the paper layer includes first and second surfaces, the first surface is a printed surface, the second surface is adhered to the plastic film the printed surface of the paper layer forms an outer portion of the laminate, and the cohesive material is applied to the plastic film.

11. The package-forming material of claim 10, wherein the paper layer includes first and second surfaces, the first surface is a metallized surface, the second surface is adhered to the plastic film and the metallized surface of the paper layer forms a decorative outer portion of the laminate.

12. A process for creating a package which encloses and seals an article therein, which comprises:
    providing a packaging material in the form of a laminate that includes a water impermeable plastic film having a first corona discharge treated surface that is adhesively cold laminated to a first paper layer, wherein the film and paper layer have the same dimensions, and the laminate has a surface that is receptive to receiving adhesive or cohesive materials;
    applying a cohesive material to one entire laminate; and
    forming a package by placing the packaging material about an article to be packaged such that a first portion of the surface of the packaging material that includes cohesive material contacts another portion of the surface that includes cohesive material to adhere such portions to each other and form a sealed package which encloses the article.

13. The process of claim 12 wherein the plastic film of the laminate includes a second surface that is adhesively laminated to a second paper layer, wherein the laminate is further prepared by corona discharge treating the second surface of the plastic film to render it receptive to adhesives, followed by adhesively cold laminating the second surface of the plastic film to the second paper layer.

14. The process of claim 12 wherein the cohesive material is applied to first and second surface portions of the packaging material and the package is formed by placing the first surface of the packaging material above the article to be packaged and by placing the second surface portion of the packaging material below the article to be packaged, such that the first and second surface portions of the packaging material that include the cohesive material contact and adhere to each other to form the sealed package which encloses the article.

15. The process of claim 14 which further comprises providing the first and second surface portions on one side of a single sheet of the laminate and then forming the package by folding the sheet around the article to be packaged to place the cohesive material containing portions in face-to-face orientation so that they can be adhered together to form the package.

16. The process of claim 14 which further comprises providing the first and second surface portions on first and second laminate sheets and placing the sheets above and below the article to be packaged with the cohesive material containing surface portions in face-to-face orientation so that they can be adhered together to form the package.

17. The process of claim 12 wherein the plastic film is adhesively cold laminated to the paper layer with an adhesive that includes a water-based acrylic copolymer composition or a vinyl acetate ethylene copolymer, wherein the paper layer is paper, Kraft paper, bond paper or white paper having a thickness of about 3 to 6 mils and the plastic film comprises polypropylene, polyethylene or polyester and has a thickness of about 1 to 3 mils.

18. The process of claim 17 wherein the paper layer of the laminate includes a printed surface, the printed surface is adhered to the plastic film, and the plastic film forms an outer portion of the package.

19. The process of claim 17 wherein the paper layer includes first and second surfaces, the first surface is a printed surface, the second surface is adhered to the plastic film and the printed surface of the paper layer forms an outer portion of the package.

20. The process of claim 19, wherein the paper layer includes first and second surfaces, the first surface is a metallized surface, the second surface is adhered to the plastic film and the metallized surface of the paper layer forms a decorative outer portion of the package.

21. The method of claim 12 wherein the adhered cohesive portions form a margin which completely surrounds the article to be packaged.

* * * * *